June 2, 1953

S. T. SHEARD ET AL 2,640,299

PROCESS OF FORMING A MULTIFOCAL LENS

Filed Dec. 7, 1949

INVENTOR
SAMUEL T. SHEARD
LOUIS F. ROWE
BY
Louis F. Gagnon
ATTORNEY

Patented June 2, 1953

2,640,299

UNITED STATES PATENT OFFICE 2,640,299

PROCESS OF FORMING A MULTIFOCAL LENS

Samuel T. Sheard, Sturbridge, Mass., and Louis F. Rowe, North Woodstock, Conn., assignors to American Optical Company, Southbridge, Mass., a voluntary association of Massachusetts Application December 7, 1949, Serial No. 131,634

3 Claims. (Cl. 49—82.1)

This invention relates to improvements in ophthalmic lenses of the bifocal or multifocal type and has particular reference to the provision of a novel method of making the same.

In forming ophthalmic lenses of the above character, particularly of the type embodying a composite button of pieces of glass of different indices of refraction fused in edge to edge relation to each other and thereafter fused within the countersink of a major piece of glass, great difficulty has been encountered in obtaining a clear, continuous and true optical surface of required shape and one free from interfacial bubbles or other defects.

It has been the practice in the past to form the segment portion of lenses of this nature with a piece of glass having a high index of refraction and a relatively low melting point fused in edge to edge relation with a piece of glass of a low index of refraction and having a relatively high melting point and of a glass which is essentially the same as the glass used in forming the major portion of the lens. The segment was provided with a surface curvature on the countersink side thereof of a shorter radius than that of the surface curvature of the countersink in the major piece of glass with the said related curvatures being such that after fusion, the curvature of the interface would be substantially that required to introduce the added power through the focal field lying within the area of the high index piece of glass.

In an attempt to avoid trapping air or gases liberated from the glasses during fusion, it has been the common practice to support the segment, adjacent one edge thereof, in spaced relation with the countersink curve by a metal wedge or the like whereby the glass, during the fusing, would sag under the action of heat to assume the shape of the countersink curve and intimately bond therewith.

It has been found that, because of the particular inherent characteristics of such glasses as were required in forming such bifocal or multifocal lenses, great difficulty has been encountered in obtaining the required high fusing qualities.

There are several factors which must be carefully controlled and considered in performing such fusing operations and some of which have been found to be the cause of the relatively low yield of practical and usable lenses.

Some of the difficulties were:

1. That of controlling the curvature throughout the interfaces of the fused pieces of glass which, as stated above, controls, in part, the added power throughout the area of the high index piece of glass;

2. The controlling of the temperatures used throughout the cycle of fusion to insure against undue flow, distortion and general break down of the assembly; and 3. The elimination of interfacial bubbles or other defects due to the trapping of air or gases between the surfaces during fusion and the improper bonding of the glasses throughout the interfaces of the glasses.

High index glasses such as the commonly known barium crown glasses when combined, under heating conditions, with a lower index glass such as the commonly known commercial crown glass tend to react to an evolution of gases which prevent practical fusions to be performed if such glasses are not carefully supported and the temperatures of the fusions carefully controlled so as to permit the escape of said gases prior to the fusing taking place throughout the interfaces of the glasses.

All of the above factors are generally known to the art but, as stated above, the inherent characteristics of the glasses and the related melting points thereof are such as to make it extremely difficult to obtain a high yield of practical and usable lenses.

Another factor which is of extreme importance and one of major consideration in overcoming the above defects is that, throughout the ophthalmic field, provision is made in the form of charts setting forth different related curvatures for use with glasses of standardized indices of refraction as far as the major optical crown portion of the lens is concerned and the minor high index portion of glass is concerned in order to insure that the resultant desired optical characteristics are obtained. This fact, and the fact that it would require new computation of related curvatures and the provision of new charts as well as a completely new set of curve generating tools for producing said curves if the indices of refraction of these portions of these lenses were altered or made different from those standard to the trade, made it imperative that the indices of refraction of these respective parts be maintained to the established standards. This point is stressed as one of major importance in that the problem is one that cannot be solved in a practical manner by the mere change of the index of refraction of the glasses whereby different fusing temperatures might be obtained.

It is one of the principal objects, therefore, of the present invention to provide glasses having newly controlled related melting points and a novel process of making bifocal or multifocal lenses therefrom whereby all of the above prior art defects will be overcome in a simple and efficient manner and with said glasses having the standardized indices of refraction of the prior art and retaining all of the advantages thereof.

Another object is to provide a novel process of forming a multifocal lens of the above character whereby a major portion of standardized optical crown glass having an index of refraction of approximately 1.523 and having the inherent melting point of such glasses is combined by fusion with a composite button embodying a minor portion of a new barium crown glass having the standard relatively high index of refraction of approximately 1.616 but having a melting point higher than that of the optical crown glass whereby substantially all of the above-mentioned prior art defects are eliminated.

Another object is to provide a novel process of forming lenses of the above character wherein the composite button is supported in spaced relation with the countersink of the major portion during fusion by a wedge or spacer of glass which is less responsive to heat than the major and filler pieces of glass but which melts at a temperature lower than that at which the high index piece of the composite button melts and in which the related positions of the pieces and the fusing temperatures and time cycles are so controlled as to cause said glasses to respond to the fusion temperatures in such manner that the filler piece will drop to the curve of the countersink prior to the softening of the segment or high index portion of the button and the glass wedge or spacer member will thereafter respond to said fusing temperature to permit the segment portion or high index glass to thereupon drop with a squeegee action into relatively intimate relation with the countersink curve and completely extrude air or other gases whereby the countersink curve will assume the preshaped curve formed on the segment portion and fusion will take place throughout the interfaces with the elimination of distortions, bubbles or other similar defects.

Referring to the drawings.

Figure 3:
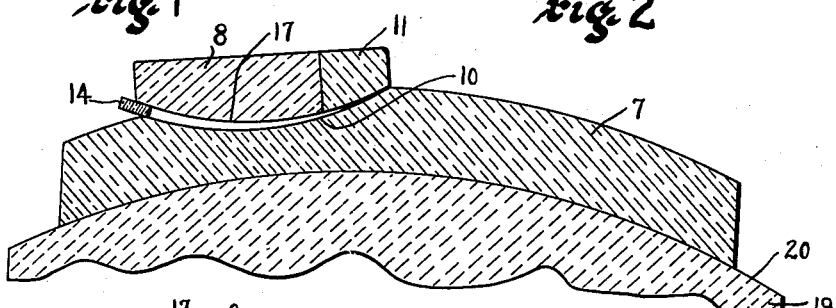
Figure 4:
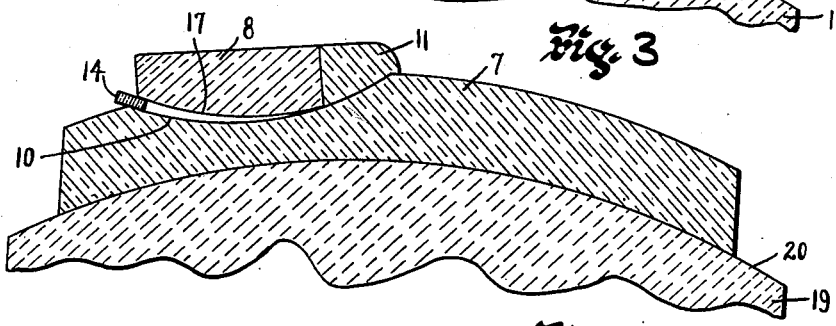
Figure 5:
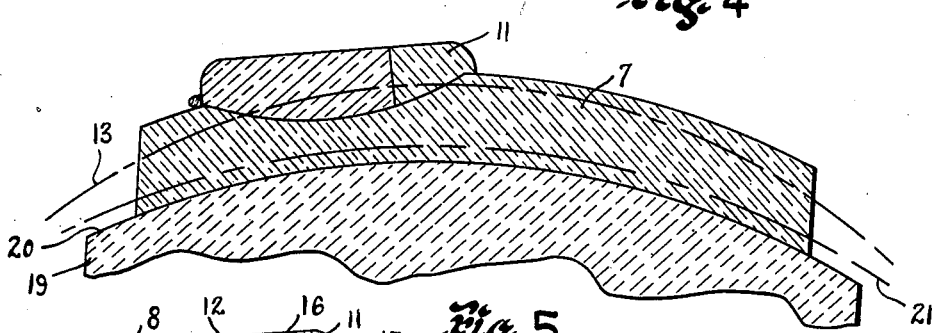
Figure 6:
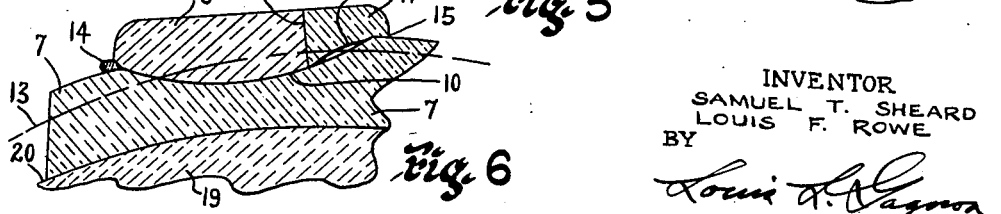

Figs. 3, 4, and 5 are enlarged sectional views illustrating the various steps in the process of manufacture; and Fig. 6 is a diagrammatic view illustrating one of the defects of the prior art methods of forming such lenses.

Figure 1:
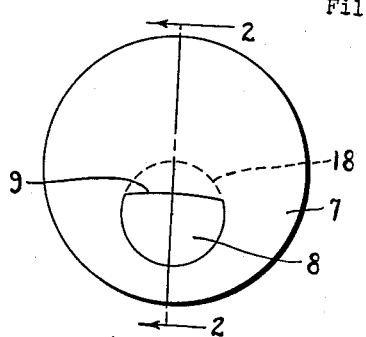
Fig. 1 is a front elevational view of a lens embodying the invention.
Figure 2:
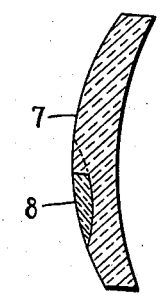
Fig. 2 is a sectional view of said lens taken as on line 2—2 of Fig. 1 and looking in the direction indicated by the arrows.

Referring to the drawings wherein like characters of reference designate like parts throughout the several views, as an illustration of one embodiment of the invention, the lens, as shown in Figs. 1 and 2, is of the commonly known bifocal type having an odd shaped reading field and comprises a major portion 7 of optical crown glass which constitutes the distance field of the lens and a minor piece of barium crown high index glass 8 which constitutes the reading field of the lens.

The reading field, in this instance, is of the commonly known three-quarter shape wherein the top portion of the segment is cut away along an upwardly arching curve 9 and is replaced by a filler piece 11 of substantially the same glass as the major portion.

In the past, it has been a common practice to form a countersink 10 in the major portion 7 of the curvature required to control, in part, the added power desired of the finished lens. The filler piece 11 is edge-fused to the minor portion 8 along the abutting edges 12 so that when the joined portions 8 button which comprises the countersink, a continuous surface 13 of desired curvature may be formed on this side of the blank.

It has been common practice to use a low index optical crown glass for the major portion 7 and for the filler portion 11 each being of substantially the same glass composition and of a relatively high melting point and to use a high index barium crown glass having a relatively low melting point for the minor portion 8.

As stated above, these glasses are of standardized indices of refraction in the ophthalmic art and the charted curves and surfacing tools throughout the trade are computed according to these indices of refraction to give the resultant corrective powers desired. The index of refraction of the minor portion 8 and the countersink curve are such as to introduce the added power curve desired throughout the area of the reading field in accordance with standard practice.

In fusing the composite button in the countersink 10, in the past, different attempts were made to so support the button and control the fusing temperatures that when fusion took place, proper bonding of the glasses throughout the interfaces thereof would result and the trapping of bubbles, interfacial distortions and other defects would be eliminated.

In view of the fact that the high index low melting barium crown glass of the segment portion 8 was the first to soften and melt under the action of heat during fusion, an attempt was made to support the portion 11 of higher melting point in spaced relation with the countersink with a view to permitting air or other gases to escape from between the pieces of glass during fusion. In view of the fact that the barium crown could not be heated to a temperature wherein it would flow too readily and that the major portion 7 and the filler portion 11 were of the same relatively high melting point, great difficulty was encountered, due to the limited temperature which could be used, in having the spacer member cause a gap to remain throughout the top of the segment. This gap, in many instances, was such that it could not be removed by the ultimate forming of the outer optical surface on the blank, as illustrated by the dot and dash line 13, as an excessive amount of glass was required to be removed with the result that the overall size of the reading field could not be properly controlled. It is quite obvious that the size of the reading field decreases as the outer surface of the lens is ground away and in order to remain within the size limits required, the above defect was, in many instances, intolerable.

An attempt was made to place the spacer member, as illustrated at 14, at the lower edge of the low melting segment 8 with the opposite edge 15 of the filler portion 11 engaging the countersink curve 10. This, however, introduced difficulty for the higher melting point glasses 7 and 11, at their area of contact, would start to adhere to each other with sufficient tenacity that these harder glasses would not bend or rock as the lower melting glass of the minor portion 8 dropped to the curve of the countersink with the result that air or other gases would be pocketed within the area 16 intermediate the superficially joined area at the point of contact 15 and the engaging glasses of the countersink and minor portion 8. It is true that some careful temperature controls could be introduced to reduce this difficulty but, here again, a positive and practical control could not be obtained.

The above methods of fusing have been commonplace in the art for many years and it was not until the present invention that the above difficulties have been overcome and the ultimate yield of high optical qualities have been greatly increased and the overall cost of such lenses greatly reduced.

In accomplishing the results of the invention, the major portion 7 is a crown glass of the same commercially standardized low index of refraction having a known controlled melting point. The portion 11 is also formed of the same glass. The minor portion 8 is of a glass having the same commercial standard high index of refraction but, however, the said minor portion 8 is of a newly developed different high index barium crown type of glass having a known controlled higher melting point than the melting point of the major portion 7 and the filler portion 11, and it is in the controlling of the fusing temperatures used with these respective glasses and the ultimate process employed in the fusing which constitutes the essence of the present invention.

Referring more particularly to Figs. 3, 4, and 5, it is particularly pointed out that the surface 17 formed on the composite segment is carefully controlled to be that required for introducing the added power desired of the finished lens.

The countersink curve can be formed to substantially the same curvature as the curve 17 or slightly flatter or of longer radius. The wedge or spacer 14, in this particular instance, is formed of glass having a melting point which is controlled according to the softening and fusing temperatures of the portions 7, 8 and 11 and the temperatures employed in fusing. The softening temperatures of the particular glasses used in the present instance are as follows:

The major crown glass portion 7 and the filler portion 11 have a Littleton softening point at approximately 1338° F. while the barium high index glass 8 has a Littleton softening point at approximately 1375° F. The glass of the wedge or spacer 14 is preferably such as to be considerably more viscous than the barium or crown glass at 1300° F. while at 1400° to 1425° F., it is considerably more fluid than the other glasses.

The temperature of fusing, in the present instance, lies between 1400° and 1450° F. depending upon the time cycle employed during said fusing.

It has been stated above that glass is very surface active and absorbs gases, moistures, etc. It has been found, however, that such gases may be driven off at relatively high temperatures below that of the actual melting point of the glasses or that of the fusing temperatures given above.

By forming the glasses with the related controlled softening temperatures, as stated above, it is possible to preheat the glasses after assembly for fusion to a temperature sufficient to drive off these gases prior to the softening of said glasses whereupon the raising of the temperature to a higher degree will cause the fusing operation to take place throughout two stages, such as diagrammatically illustrated in Figs. 4 and 5. It is particularly pointed out that due to the fact that the glasses of the major portion 7 and the filler portion 11 are of substantially the same melting point and do soften and respond to heat sooner than the segment portion 8, the said portion 11 will first drop to and assume the shape of the countersink curve throughout its area and become relatively intimately bonded thereto at the temperature used in the fusing process. It is pointed out that because its outer edge only is in initial contact with the major portion, air or gases will be forced outwardly from between said pieces of glass by a squeegee action when the portion 11 drops to the countersink curve 10. During this movement the adjacent portion of the segment 8 will simultaneously move to a related position such as illustrated in Fig. 4. It is to be noted that the wedge 14, at this stage, has not permitted the portion 8 adjacent thereto to drop to the countersink. It is quite obvious that all gases or air that might be trapped between the portions 7 and 11 has been expelled by a squeegeeing action which takes place during the dropping of the portion 11 to the curve of the countersink.

Due to the fact that the spacer or wedge 14 then follows the portion 11 in its response to the fusion temperature and will thereupon soften and allow the portion 8 to drop into engagement with the adjacent surface curvature of the countersink 10, air and gases will be automatically driven out from between the interfaces. It is pointed out here that the portion 8, due to its higher melting point, at this stage has not softened sufficiently to lose the shape of its initial curvature 17 and will thereupon cause the adjacent countersink 10 to assume the shape of the curvature 17 prior to fusion taking place throughout the interface of said pieces of glass. The glasses, in their final fused state, are diagrammatically illustrated in Fig. 5 whereupon the blank is ready to have a surface curvature, illustrated by the dot and dash line 13, generated thereon to a depth which is such as to control the ultimate size of the segment or reading field 8.

Due to the fact that the glasses 7 and 11 are of substantially the same composition, index and same melting point, very little, if any, gases will be evolved throughout the interfaces thereof and said glasses will thereby join into a homogeneous structure whereupon the upper curve of the countersink, illustrated by the dash line 18, will disappear.

With glasses having the above related melting points, the final specific fusion temperature which has produced very successful results is approximately 1425° F. and the time cycle of fusion is approximately three minutes. It is to be understood, however, that if the fusion temperature is lowered, the time cycle is increased proportionately and vice versa.

Although applicant has described two heating ranges, it is to be understood that the usual preheating to obviate heat shock may be employed, that is, the initially lower temperatures of around 500° or 600° for said preheating may be employed whereupon the preheating temperature may be run up to from 900° to 1000° F. and thence up to a temperature of between 1150° to 1300° F. to drive off the gases and thence up to the ultimate temperature required for fusion.

It is pointed out that with the above related melting points of the glasses wherein the segment 8 has a higher melting point than the optical crown glasses of the major portions 7 and the filler portion 11, and by supporting the said glasses in spaced assembled relation with each other as shown diagrammatically in Fig. 3 by a wedge 14 of glass controlled to respond to heat of a desired temperature, as specified above, and by controlling the temperature and time cycle of fusion with said glasses it has been possible to obtain a greatly increased yield of practical lenses. This is due to the elimination of distortion of the interfacial curve and the elimination of air bubbles or other defects which were so prevalent with prior art methods.

Although the filler portion 11 has been referred to as being the same index of refraction as the major portion 7, it is to be understood that a filler portion of a slightly higher index of refraction or of an index of refraction intermediate that of the segment portion 8 and the major crown portion 7 might be employed in which case a trifocal lens could be formed, keeping in mind, of course, that the softening point of said portion 11 must be less than the softening temperature of the portion 8 and substantially that of the major portion 7 or only slightly higher than said major portion.

During the fusing operation, the assembly is supported on a suitable refractory 19 having its upper surface 20 shaped substantially to the adjacent curvature of the engaging surface of the major portion 7.

In completing the lens, a surface of the required prescriptive curvature, as illustrated by the dot and dash line 21, is formed on the opposed side of the blank.

It is further to be understood, of course, that the engaging surfaces of the segment and countersink are thoroughly cleansed prior to fusion in order to avoid the existence of dirt, dust or other foreign matter.

Although glasses having certain given melting points have been set forth above, it is to be understood that glasses having melting points other than those called for may be used. It is essential, however, that substantially the same ratio and related differences be maintained and that the related indices of refraction be held to the established standards. It is quite obvious that the fusing temperatures and time cycles will be altered according to melting points of the particular glasses used.

It has been stated above that the index of refraction of the portion 8 in the particular example given is 1.616 but it is to be understood that the index of refraction of the portion 8 may be varied from 1.57 to 1.66 as desired depending upon the ultimate thickness of the final lens. When the index of refraction is varied, the curve of the countersink is accordingly varied in order to obtain the final added power desired.

From the foregoing description, it will be seen that novel and improved lenses and a new and improved process has been provided in accordance with the objects and advantages of the invention.

Although the novel features and process have been shown and described and are pointed out in the annexed claims, it will be understood that many changes may be made as to the glasses, fusing temperatures and steps of the process shown and described without departing from the spirit of the invention as expressed in the accompanying claims. Therefore, it is to be understood that all matters and process are to be interpreted as illustrative of the invention and are not to be construed in a limiting sense.

Having described our invention we claim:

1. In the process of forming a multifocal lens of the type embodying a main element of one index of refraction having a concave seat therein and a composite button embodying a piece of lens medium of a higher index of refraction than the main element fused to said seat, the steps comprising first edge-fusing the lens medium of high index of refraction with a filler piece of lens medium having a substantially lower index of refraction and lower softening point than said lens medium of high index of refraction to form a composite button, shaping the under surface of the button to a convex shape in accordance with the added power desired in the finished lens, forming a concaved seat in the upper surface of a main element of an index of refraction lower than the high index medium of the button and having a softening point approaching that of said filler piece, resting an outer peripheral portion of the filler piece of said button on the edge of the concave seat in said upper surface of the main element and supporting the peripheral edge of the high index lens medium of the button off the edge of the concave seat by spacer means positioned between said high index lens medium and the edge of the concave seat, and under the action of heat causing first the filler piece to soften and drop into intimate relation with the seat and simultaneously carry the fused edge of the high index lens medium therewith and thereafter the remainder of the high index lens medium to drop onto said seat to cause said seat to assume the shape of the under-side of said high index lens medium and cause said composite button to fuse to said seat, said underside and refused edge of said high index lens medium remaining substantially unchanged during said dropping and fusing of the button to said seat.

2. In the process of forming a multifocal lens of the type embodying a main element of one index of refraction having a concave seat therein and a composite button embodying a piece of lens medium of a higher index of refraction than the main element fused to said seat, the steps comprising a first edge-fusing the lens medium of high index of refraction with a filler piece of lens medium having a substantially lower index of refraction and lower softening point than said lens medium of high index of refraction to form a composite button, shaping the under surface of the button to a convex shape in accordance with the added power desired in the finished lens, forming in the upper surface of a main element having an index of refraction and a softening point approaching that of said filler piece a concaved seat of relatively shallower curvature than that of the underside of the button, resting an outer peripheral portion of the filler piece of said button on the edge of the concave seat in said upper surface of the main element and supporting the peripheral edge of the high index lens medium of the button off the edge of the concave seat by spacer means positioned between said high index lens medium and the edge of the concave seat, and, under the action of heat, causing first the filler piece to soften and drop into intimate relation with the seat and simultaneously carry the fused edge of the high index lens medium therewith and thereafter the remainder of the high index medium to drop onto said seat to cause said seat to assume the shape of the underside of said high index lens medium and cause said composite button to fuse to said seat, said underside and fused edge of said high index lens medium remaining substantially unchanged during said dropping and fusing of the button to the seat.

3. In the process of forming a multifocal lens of the type embodying a main element of one index of refraction having a concave seat therein and a composite button embodying a piece of lens medium of a higher index of refraction than the main element fused to said seat, the steps comprising first edge-fusing the lens medium of high index of refraction with a filler piece of lens medium having a substantially lower index of refraction and lower softening point than said lens medium of high index of refraction to form a composite button, shaping the under surface of the button to a convex shape in accordance with the added power desired in the finished lens, forming a concaved seat in the upper surface of a main element of an index of refraction lower than the high index medium of the button and having a softening point approaching that of said filler piece, resting an outer peripheral portion of the filler piece of said button on the edge of the concave seat in said upper surface of the main element and supporting the peripheral edge of the high index lens medium of the button off the edge of the concave seat by spacer means positioned between said high index lens medium and the edge of the concave seat, said spacer means having a softening point intermediate that of the filler piece and the high index lens medium of the button and under the action of heat causing first the filler piece to soften and drop into intimate relation with the seat and simultaneously carry the fused edge of the high index lens medium therewith and thereafter the spacer means to soften and allow the remainder of the high index lens medium to drop onto said seat causing said seat to assume the shape of the under-side of said high index lens medium and said composite button to fuse to said seat, said underside and fused edge of said high index lens medium remaining substantially unchanged during said dropping and fusing of the button to said seat.

SAMUEL T. SHEARD.
LOUIS F. ROWE.

References Cited in the file of this patent
UNITED STATES PATENTS

| Number | Name | Date |
| --- | --- | --- |
| 1,282,877 | Laabs | Oct. 29, 1918 |
| 1,596,397 | Bugbee | Aug. 17, 1926 |
| 1,734,428 | Haering | Nov. 5, 1929 |
| 1,845,940 | Stanley | Feb. 16, 1932 |
| 1,912,165 | Silverman | May 30, 1933 |
| 1,980,401 | Haering | Nov. 13, 1934 |
| 1,996,442 | Stanley | Apr. 2, 1935 |
| 2,053,377 | Price | Sept. 8, 1936 |
| 2,054,351 | Wells | Sept. 15, 1936 |
| 2,112,659 | Reh | Mar. 29, 1938 |